United States Patent

Moller et al.

[11] Patent Number: 5,805,686
[45] Date of Patent: Sep. 8, 1998

[54] TELEPHONE FRAUD DETECTION SYSTEM

[75] Inventors: Jens L. Moller; Matthew L. Galetti, both of Colorado Springs; Terrill J. Curtis, Pueblo West, all of Colo.; Trung Mai, Farmingdale, N.J.

[73] Assignee: MCI Corporation, Washington, D.C.

[21] Appl. No.: 577,888

[22] Filed: Dec. 22, 1995

[51] Int. Cl.[6] .................................................. H04M 3/00
[52] U.S. Cl. ...................... 379/198; 379/196; 379/112; 379/114
[58] Field of Search .................................... 379/111, 112, 379/113, 114, 118, 121, 122, 188, 189, 196, 197, 198, 133, 134, 136

[56] References Cited

U.S. PATENT DOCUMENTS 5,220,593  6/1993  Zicker et al. ............................ 379/59
5,438,571  8/1995  Albrecht et al. ........................ 370/408
5,590,181  12/1996  Hogan et al. ............................ 379/114

*Primary Examiner*—Krista Zele
*Assistant Examiner*—Daniel S. Hunter

[57] ABSTRACT

A fraud detection system is disclosed for telephone PBX calls. The system includes a fraud data server for buffering the call detail records relating to inbound 800 number calls and outbound international calls. A threshold manager is connected at its input to an output of the fraud data server for detecting numerical counts exceeding preselected threshold values, in predetermined fields of the call detail records, and generates an alarm. The output of the threshold manager is connected to an input of the fraud data server for buffering the alarm incident to respective call detail records. A computer workstation is connected to the fraud data server for receiving packets of call detail records relating to alarm data, in a filtered preselected format. The workstation includes a monitor for displaying the alarm data on a graphical interface.

11 Claims, 8 Drawing Sheets

GLOSSARY OF ABBREVIATIONS

| | |
|---:|---|
| ANI | AUTOMATIC NUMBER IDENTIFICATIONS |
| AP | ADJUNCT PROCESSORS |
| CDR | CALL DETAIL RECORDS |
| CPE | CUSTOMER PREMISE EQUIPMENT |
| DAL | DEDICATED ACCESS LINES |
| FCD | FRAUD COMMUNICATION DISTRIBUTOR |
| FCG | FRAUD COMMUNICATIONS GATEWAY |
| FDS | FRAUD DATA SERVER |
| FP | FRAUD PARSER |
| ICW | INTEGRATED CUSTOMER WORKSTATION |
| INMS | INTEGRATED NETWORK MANAGEMENT SERVICES |
| NPA-NXX | NUMBERING PLAN AREA-NETWORK NUMBER EXCHANGE |
| PBX | PRIVATE BRANCH EXCHANGE |
| TM | THRESHOLD MANAGER |

*FIG. 4*

| EXAMPLE 1: INBOUND 800 MONITORING PLAN |||
|---|---|---|
| GENERAL INFORMATION |||
| THE CUSTOMER HAS A TOTAL OF 500 INBOUND 800 NUMBERS OF WHICH 300 TERMINATE ON BUSINESS LINES AND 200 TERMINATE ON A DAL. THE CUSTOMER MAY SPECIFY A PLAN THAT INCLUDES 25 NUMBERS THAT TERMINATE ON A DAL. |||
| PARAMETERS |||
| DAY OF WEEK | TIME OF DAY | THRESHOLDS |
| MONDAY-FRIDAY | 8:00-17:59 (BUSINESS) | SHORT CALLS: 18 SECONDS/50 TOTAL |
| | | LONG CALLS: 120 MINUTES/10 TOTAL |
| | | TOTAL MINUTES: 2000 MINUTES |
| | 18:00-7:59 (NON-BUSINESS) | SHORT CALLS: 18 SECONDS/10 TOTAL |
| | | LONG CALLS: 120 MINUTES/3 TOTAL |
| | | TOTAL MINUTES: 500 MINUTES |
| SATURDAY-SUNDAY | 7:00-19:59 (BUSINESS) | SHORT CALLS: 18 SECONDS/30 TOTAL |
| | | LONG CALLS: 120 MINUTES/10 TOTAL |
| | | TOTAL MINUTES: 300 MINUTES |
| | 20:00-6:59 (NON-BUSINESS) | SHORT CALLS: 18 SECONDS/30 TOTAL |
| | | LONG CALLS: 120 MINUTES/3 TOTAL |
| | | TOTAL MINUTES: 120 MINUTES |
| RISK FACTORS |||
| NPX-NXX | RISK | EXPLANATION |
| 202-887 | 1.5 | THE CUSTOMER KNOWS THAT IT WANTS TO PAY PARTICULAR ATTENTION TO CALLS FORM CERTAIN HIGH-RISK NPA-NXXs, SO IT ASSIGNED RISK FACTORS TO THEM (NOTE: ALL OTHER NPA-NXXs WOULD HAVE A DEFAULT RISK FACTOR OF 1.0) |
| 202-955 | 3.0 | |
| 301-756 | 2.5 | |
| SUSPECT NUMBERS |||
| 033-719-555-1212　033-701-654-4321　044.2.126.1278 + MCI GLOBAL LIST 033-202-556-1200　033-512-555-1234　122.57.3.157.1100 (FOREIGN NUMBERS) |||
| SAMPLE ALARMS |||
| TYPE | CAUSE ||
| LONG (L) | 4 CALLS OVER 120 MINUTES IN DURATION FROM LOW-RISK NPA-NXXs ON A TUESDAY DURING NON-BUSINESS HOURS ||
| SHORT (S) | 21 CALLS OF LESS THAN 18 SECONDS IN DURATION FROM THE 301-756 EXCHANGE DURING BUSINESS HOURS ON A MONDAY ||
| CUMULATIVE (M) | 121 CUMULATIVE MINUTES ON A SATURDAY DURING NON-BUSINESS HOURS ||
| SUSPECT (A) | CALL WAS DETECTED FROM 033-719-555-1212 ||

*FIG. 5*

| EXAMPLE 2: OUTBOUND INTERNATIONAL MONITORING PLAN |||
|---|---|---|
| GENERAL INFORMATION |||
| THE CUSTOMER MAY SPECIFY A PLAN THAT INCLUDES 25 DALs LOCATED AT FACILITY X. |||
| PARAMETERS |||
| DAY OF WEEK | TIME OF DAY | THRESHOLDS |
| MONDAY-FRIDAY | 8:00 - 16:59 (BUSINESS) | LONG CALLS: 40 MINUTES/5 TOTAL |
| | | TOTAL CALLS: 300 |
| | | TOTAL MINUTES: 240 MINUTES |
| | 17:00 - 7:59 (NON-BUSINESS) | LONG CALLS: 40 MINUTES/3 TOTAL |
| | | TOTAL CALLS: 100 |
| | | TOTAL MINUTES: 120 MINUTES |
| SATURDAY - SUNDAY | 9:00 - 15:59 (BUSINESS) | LONG CALLS: 40 MINUTES/3 TOTAL |
| | | TOTAL CALLS: 100 |
| | | TOTAL MINUTES: 120 MINUTES |
| | 16:00 - 8:59 (NON-BUSINESS) | LONG CALLS: 40 MINUTES/3 TOTAL |
| | | TOTAL CALLS: 10 |
| | | TOTAL MINUTES: 60 MINUTES |
| RISK FACTORS |||
| COUNTRY | RISK | EXPLANATION |
| PAKISTAN | 3.0 | THE CUSTOMER KNOWS THAT IT WANTS TO LIMIT THE CALLS TO CERTAIN FOREIGN COUNTRIES, SO IT ASSIGNED RISK FACTORS TO THEM. (NOTE: ALL OTHER COUNTRIES WOULD HAVE A DEFAULT RISK FACTOR OF 1.0) |
| INDIA | 5.0 | |
| COLUMBIA | 2.0 | |
| SUSPECT NUMBERS |||
| 033-719-555-2121 | 033-512-555-1234 | + MCI GLOBAL LIST |
| SAMPLE ALARMS |||
| TYPE | CAUSE ||
| NUMBER (N) TOTAL CALLS (T) | 30 CALLS ARE TO COLUMBIA AND 14 CALLS ARE TO PAKISTAN (A TOTAL OF 102 RISK-ADJUSTED CALLS) DURING NON-BUSINESS HOURS ||
| LONG (L) | TWO CALLS OVER 40 MINUTES IN LENGTH TO COLUMBIA ON A SATURDAY DURING NON-BUSINESS HOURS (A TOTAL OF 4 RISK-ADJUSTED CALLS) ||
| CUMULATIVE (M) | TWO 30-MINUTE CALLS TO INDIA ON A WEDNESDAY DURING BUSINESS HOURS (A TOTAL OF 300 RISK-ADJUSTED MINUTES) ||
| SUSPECT (A) | CALL WAS DETECTED FROM 033-719-555-2121 ||

*FIG. 6*

TELEPHONE FRAUD DETECTION SYSTEM

FIELD OF THE INVENTION

The present invention relates to telephone systems, and more particularly to a fraud detection and monitoring system for PBX use.

BACKGROUND OF THE INVENTION

Phone fraud is an ever-increasing problem in this country. To combat the problem, long-distance carriers are developing products to detect fraud in its early stages. In recent years, customer liability for the unauthorized use of customer premise equipment (CPE) and calling card numbers to make long-distance calls is estimated at over $2 billion annually. In some cases, a customer may incur charges in excess of $100,000 over the course of one weekend. To maintain good relations with the public, long distance carriers, including MCI, often assume the majority of the liability for these calls. As a result, both carriers and customers are increasingly seeking measures to reduce the occurrence of phone fraud. Phone fraud consists of two types: CPE related and calling card related. This invention deals with CPE related fraud.

CPE-related fraud occurs when a third party gains illegal access to a customer's PBX (private branch exchange) and steals the dial tone to make outgoing calls. This is a particular problem with hackers dialing 800 (toll-free) numbers and then gaining access to an outbound trunk. Outgoing calls are charged to the CPE owner regardless of the origination of the call. From a financial standpoint, the worst and most costly form of abuse involves international calls.

At the present time, fraud analysis of PBX use is typically done by manually reviewing call data records, after an initial data sorting, to detect patterns indicative of fraud. However, as will be appreciated, this is a laborious and time-consuming process which results in long delays between the actual occurrence of fraud and the manual review and detection thereof.

BRIEF DESCRIPTION OF THE PRESENT INVENTION

The present system is referred to as MCI Detect™ and provides long distance carriers such as MCI with an automated (and improved) method of detecting fraud. MCI Detect™ is a trademark of MCI Communications Corporation. In the recent past, two types of calls have been the focus of most of the fraudulent CPE-related activity and the cause of the greatest financial liability for MCI and its customers. Fraud is suspected when an unusual calling pattern is detected, such as the following:

Inbound 800 number calls (hereinafter referred to as inbound 800);

Outbound international calls (hereinafter referred to as outbound international);

Numerous short duration calls which may indicate that hackers are attempting entry.

The invention monitors the two types of non-residential calls that are most susceptible to fraud:

Excessively long calls which may indicate that hackers are using inbound trunks to make outbound calls;

An unusual number of calls to foreign countries;

An unusual number of calls during non-business hours.

Fraud may also be suspected when calls originate from prisons, pay phones, hotels, hospitals, etc. The call detail records (CDRs) associated with each call contain information digits which provide this type of information. Calls originating from certain dialing areas, such as Manhattan, may also be cause for concern. NOTE: A dialing area is known as a Numbering Plan Area—Network Number Exchange (NPA-NXX).

Past experience with fraud also reveals suspect numbers which may be specific phone numbers (ANIs or Automatic Number Identifications) or dedicated access lines (DALs). Both an ANI and a DAL can be tracked to a specific home or business. Prepared with information about how to detect CPE-related fraud, MCI was able to determine which data to collect in order to develop monitoring plans for its customers. For calls to specific 800 numbers or from certain ANIs or DALs, MCI collects the following:

Total number of short-duration calls

Total number of long-duration calls

Total number of calls of any type

Total number of cumulative minutes from any type of call.

MCI Detect keeps count of the number of calls in each category over previously defined time periods such as during non-business hours on a weekend. Customers may specify what is considered to be a long or short call, or too many calls. The maximum allowable amount in any category is a threshold. Exceeding a threshold results in an alarm.

MCI Detect also permits customers to associate a risk with certain types of calls. For inbound 800 calls, risk factors may be assigned to calls from specific NPA-NXXs, information digits, and countries. For outbound international calls, the risk may be assigned to calls to specific countries only. When a risk is associated with a call, the statistic for that call is multiplied by the assigned risk factor (any number between 1.0 and 100.0). For example, if an outbound call to Cuba is assigned a risk of 2.0, then such a call is counted twice. In this way, a threshold is exceeded more quickly. It does not mean, however, that this call will automatically generate an alarm.

MCI also maintains a global list of suspect numbers so that it can monitor calls from specific numbers (ANIs or DALs) where fraud has been detected in the past. Customers may modify this list to suit their purposes. When a call from a suspect number is detected, an alarm is immediately generated regardless of the current totals in relevant monitoring categories.

The purpose behind compiling so many statistics is that customers may combine them in a variety of ways to create a truly customized monitoring plan.

The first component for fraud control is the switched network used by MCI to provide long distance services to its customers. Switching is the ability to route calls to different locations within the public phone network on a call-by-call basis rather than limiting transmission between predetermined fixed points. For example, a call from New York to Los Angeles may be routed through Chicago in one instance and through Atlanta and Denver in another. At each point in the network where lines converge, a switch is in place. The switch makes, breaks, or changes connections among the phone circuits in order route calls to their destination.

Co-located with every switch are computer systems, adjunct processors (APs), which assist in loading billing information and software into the switch. MCI's billing software, Traffic 2000 (T2000), also acts as a screening device by examining the detailed information (call detail records [CDRs]) associated with each call. Only relevant CDRs—non-residential inbound 800 calls and outbound international calls—are sent to MCI Detect. This prevents the fraud data system from becoming overwhelmed with data.

MCI Detect accepts the CDRs, immediately analyzes the call traffic, and keeps a running total of the counts (for example, number of short-duration calls) and thresholds for each monitoring plan stored in its database. Each monitoring plan is a set of parameters which govern how fraud will be detected for a specific type of call. MCI has developed several generic plans, but customers may also develop their own plans.

Each monitoring plan has three features:
Thresholds
Risk factors
Suspect numbers.

A threshold is a number which, when exceeded, generates an alarm in MCI Detect indicating possible fraud. For example, if a customer indicates that it should receive no more than 1000 calls to its 800 number on any given business day, then the number "1000" is a threshold, and the 1001st call will generate an alarm. Thresholds may be specified for the time of day and/or the day of the week. Furthermore, a threshold may be applied to each category for which MCI Detect keeps counts, including the number of short-duration calls, long-duration calls, and cumulative minutes.

As described previously, risk factors and suspect numbers help to determine the likelihood of fraud based on the assumption that some types of calls more clearly indicate fraud than others. For example, a call from a high-risk dialing area may be assigned a weight of 3.0. Each time such a call is recorded, relevant counts are multiplied by a factor of 3 and thresholds are exceeded more quickly. The detection of a suspect number immediately triggers an alarm in MCI Detect. It is not necessary to apply weights to these numbers.

Every MCI commercial customer is automatically assigned to a Universal Plan initially. Customized plan data is later entered by MCI representatives. Inbound and outbound thresholds are provided in separate plans; therefore, a customer can have both an inbound plan and an outbound plan active simultaneously. (Table 1 and Table 2 in FIGS. 5 and 6 show two examples of customer monitoring plans.)

When an alarm is generated by MCI Detect, it is also prioritized. The priority is a multiple of the number of times a threshold has been exceeded. For example, if the threshold was 10 and the relevant count has reached 50, then the priority of the alarm is 5 (50÷10).

Each alarm is available to an MCI fraud analyst via an MCI Detect Workstation. The workstation is a PC with access to a Fraud Data Server and retrieves the next available alarm of the highest priority. The analyst investigates the alarm data and, if fraud is suspected, notifies the customer and suggests appropriate actions to stop the fraud.

Based upon both MCI's and the customer's experiences with fraud, the customer's monitoring plan(s) may be modified with a new set of parameters or suspect numbers. This fine tuning is needed to more accurately detect fraud and to prevent false alarms.

Since the elapsed time between the completion of a call and the generation of an alarm by MCI Detect is 15 minutes or less, a significant improvement has been made over the 3–4 days required previously. MCI plans to reduce this time further to the point where fraud is detected while the call is in progress. Detecting fraud in progress permits actions to limit its impact, such as shutting down a DAL, to be taken as quickly as possible. In addition to changing the way that calls are processed at the switch level, in-progress detection requires effective calling statistics and a complete and current list of suspect numbers.

In maximizing the flexibility of customer monitoring plans, MCI Detect both minimizes false alarms and provides advantages over current competing products. The features that put MCI Detect above the competition are the following:

The flexibility to specify the ANIs and DALs that will be monitored and the monitoring thresholds and parameters for each.

MCI Detect's timely detection and notification of 15 minutes or less.

Calls to all foreign countries are monitored, not just a subset consisting of high-fraud countries.

Risk factors are applied to NPA-NXXs, information digits, and specific countries, which minimizes false alarms and also provides early notification of abnormal calling patterns.

Customers will have the option of specifying any of the following media for alarm notification: telephone, MCI Mail™, fax, pager Integrated Network Management Services (INMS), or Integrated Customer Workstation (ICW).

To increase customer involvement in fraud detection, MCI will allow MCI customers to monitor their own inbound 800 and outbound international traffic. Using MCI Detect directly, customers may create, modify, and delete monitoring plans and view alarms.

BRIEF DESCRIPTION OF THE FIGURES

The above-mentioned objects and advantages of the present invention will be more clearly understood when considered in conjunction with the accompanying drawings, in which:

FIG. 4 is a glossary table of abbreviations.

FIGS. 5 and 6 are examples of monitoring plans that include various parameters for detecting fraud.

DETAILED DESCRIPTION OF THE INVENTION

Figure 1:
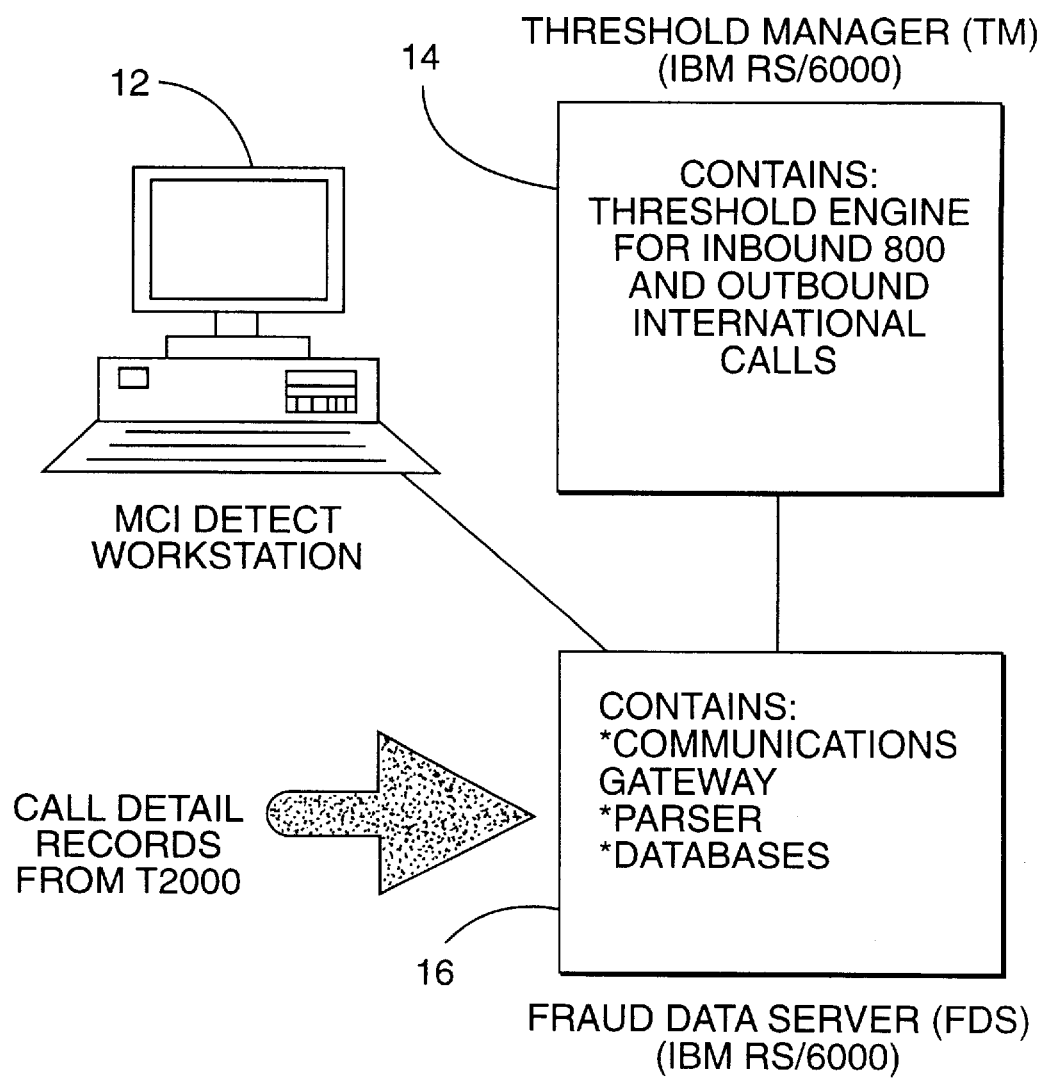
FIG. 1 is an overview of the present fraud detection system in block diagram form.

Referring to FIG. 1, MCI Detect architecture 10 consists of three basic systems:

MCI Detect Workstation 12
MCI Detect Threshold Manager (TM) 14
Fraud Data Server 16.

Each system is resident on a separate computer, and the software is unique to the local computer platform.

Figure 2:
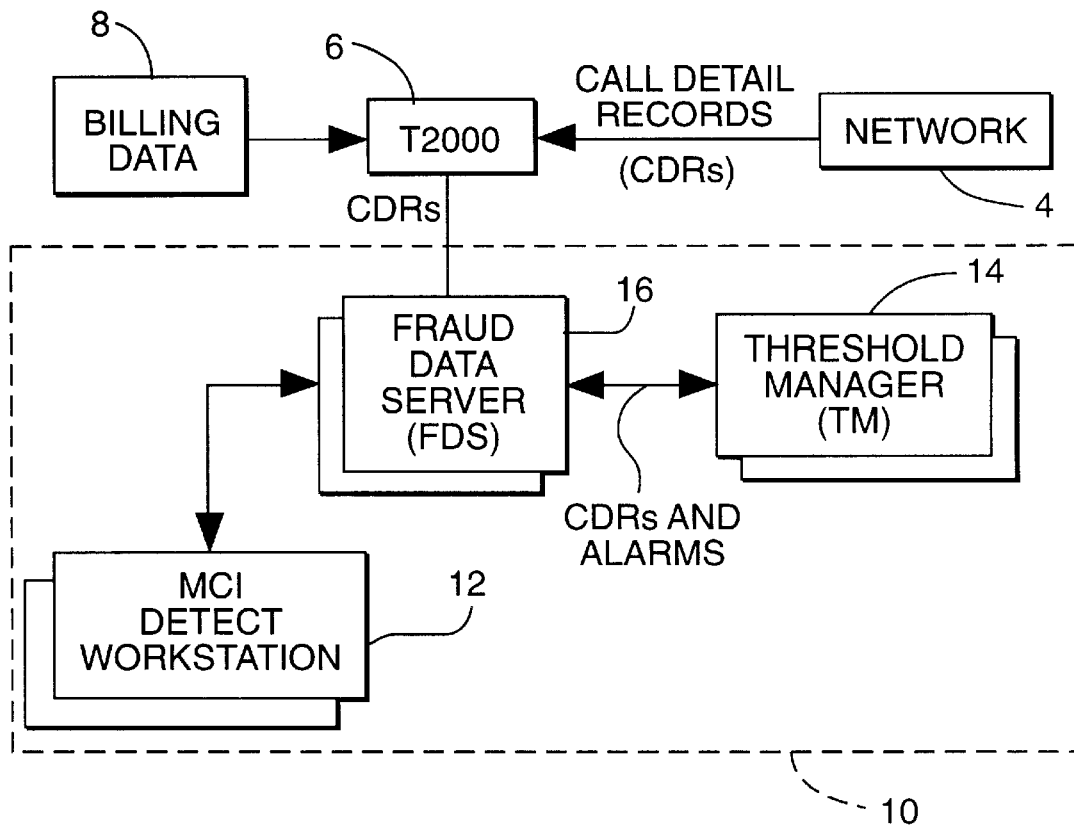
FIG. 2 is a block diagram of the system architecture for the present invention, indicating greater detail than that shown in FIG. 1.
Figure 3:
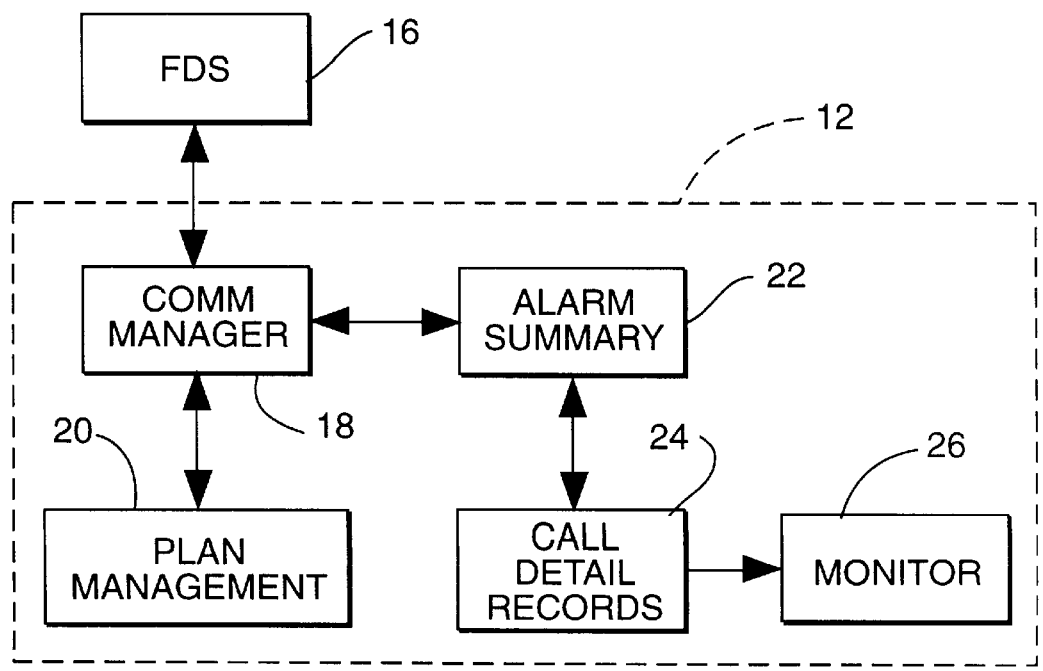
FIG. 3 is a block diagram of the workstation, as shown in FIG. 2.

The following will describe the system operation as indicated in FIGS. 2 and 3.

Referring to FIG. 2, the architecture of the present invention is shown in greater detail. The MCI network 4 generates call detail records (CDRs) which are input to an IBM-based computer system, indicated in block 6 as a T2000 (Traffic 2000). The system stores CDRs generated by the network 4. The T2000 system conventionally processes billing data, as indicated by reference numeral 8. The CDRs and billing data are retained in the T2000 for a period of time normally required to conduct fraud analysis. Typically, this would be for a period of 24 hours. The components 4, 6 and 8, employed by MCI Detect 10, constitute prior art.

With continued reference to FIG. 1, the output of the T2000 can provide call records including CDRs and billing data to the input of the MCI Detect system 10, and more particularly to a fraud data server (FDS) 16. The server is of conventional design and includes a buffer for recently retrieved call records which have been obtained from the T2000. The FDS provides call records to a threshold manager (TM) which processes the call records by reviewing the fields thereof and comparing these fields with established thresholds. When thresholds are exceeded, they indicate the possible occurrence of fraud.

Alarms are generated by the threshold manager 14 when such thresholds are exceeded. The alarms are transmitted to the FDS 16 that subsequently communicates the alarms to the workstation 12. The workstation also has access to the call records buffered in the FDS 16 so that an analyst at MCI, or an analyst at the network customer site, may have access to the necessary information to finally determine the occurrence of fraud. Since the FDS normally only buffers previously recently retrieved records, the workstation 12 may obtain older call records by querying the T2000.

The workstation 12 is preferably a PC workstation operating with an OS/2 operating system. FIG. 3 indicates the workstation 12 in greater detail. The workstation communicates bidirectionally with the FDS 16, the latter keeping track of updated alarm conditions fed back from the TM 14. The FDS produces alarm summaries from the alarm data fed back from the TM 14. The communications manager 18 provides alarm summary information packets to other objects of the workstation. In FIG. 3, the presence of recent actual alarm summaries, tabulatable on a priority basis, is indicated by object 22. Call detail records, as indicated by workstation object 24, are presented in graphical interface format to an analyst who can change the status of a particular alarm situation, as well as various status conditions. These changes are communicated to the FDS 16 by virtue of a communications path back through the alarm summary object 22 and the communications manager 18. From time to time, it may be necessary to change the thresholds of the TM 14. Threshold conditions vary for different accounts, according to preselected sets of parameters, referred to plan management, and indicated in FIG. 3 by object 20. The parameters are shown in various examples in FIGS. 5 and 6.

THE MCI DETECT WORKSTATION

Each MCI Detect workstation 12 may be an IBM PS/2 (486-based) personal computer running OS/2 version 2.1 or later. IBM's Presentation Manager™ provides the graphical user interface. The workstation communicates (via TCP/IP Protocol) with the Fraud Data Server 16 to extract alarm and plan data as previously mentioned. Up to 50 analysts may log onto MCI Detect workstations at one time. The estimated workload per workstation is 100 alarm resolution attempts per 24 hours.

MCI DETECT THRESHOLD MANAGER

The MCI Detect Threshold Manager provides real-time threshold analysis (that is, it continuously monitors for plan thresholds that have been exceeded) using algorithms (for example, number of short-duration inbound 800 calls). Examples are indicated in FIGS. 5 and 6. It receives call detail records from the Fraud Data Server 16 and returns alarms which may be retrieved and examined using an MCI Detect workstation. The threshold manager resides on an IBM RS/6000 computer running the AIX operation system.

FRAUD DATA SERVER

The MCI Detect workstation 12 interacts with the Fraud Data Server 16 to obtain current and historical fraud-related data, including CDRs, thresholds and other plan data, and alarms.

The Fraud Data Server system consists of four major functional systems:

Fraud Communications Gateway (FCG)—acts as the interface with external data systems and eliminates unwanted CDRs from entering the data server. This interface allows communication protocols to be changed without affecting the rest of the fraud data systems.

Fraud Parser (FP)—reformats CDRs for processing and passes the records to the threshold manager.

Fraud Data Server (FDS)—manages databases of current and archived alarm data, customer plans, and other miscellaneous data.

Fraud Communication Distributor (FCD)—provides the data server with the ability to communicate with multiple fraud workstations. Alarms and call information are sent to the fraud workstations via this interface.

The Fraud Data Server resides on a separate IBM RS/6000 computer running under the AIX operating system and using the SYBASE relational database management system.

PROCESS FLOW CHARTS

The process for Inbound 800 fraud detection is identified. An analogous process is conducted for Outbound International fraud detection.

Figure 7:
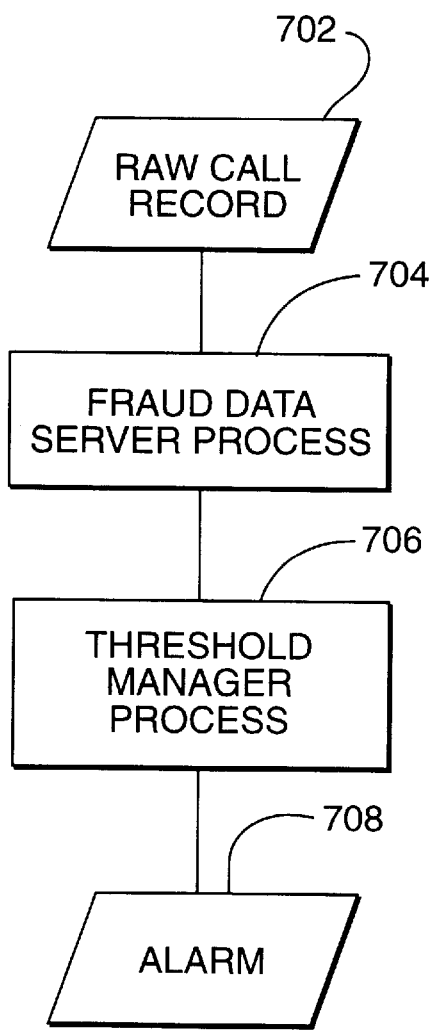
FIG. 7 is a flow diagram of the overall process corresponding to the system of FIG. 2.

In reference to FIGS. 2 and 7, which show the overall process and system for fraud detection, a raw call record 702 is sent from Traffic 2000 System 6. This call record contains numerous data regarding a single call. The call record 702 is input to the Fraud Data Server Process 704, which is specified in detail later in reference to FIG. 8. The Fraud Data Server Process 704 formats the call record into a message that is readable by the Threshold Manager. The Fraud Data Server (FDS) then feeds the formatted call record to the Threshold Manager (TM) as input to the Threshold Manager Process 706, which is specified in detail later in reference to FIG. 9. The Threshold Manager Process 706 determines the need for generating an alarm, as well as the priority of that alarm. If the TM determines an alarm is needed, an alarm 708 is generated and sent back to the FDS to be recorded in a database and presented to the Workstation 12 (FIG. 1).

Figure 8:
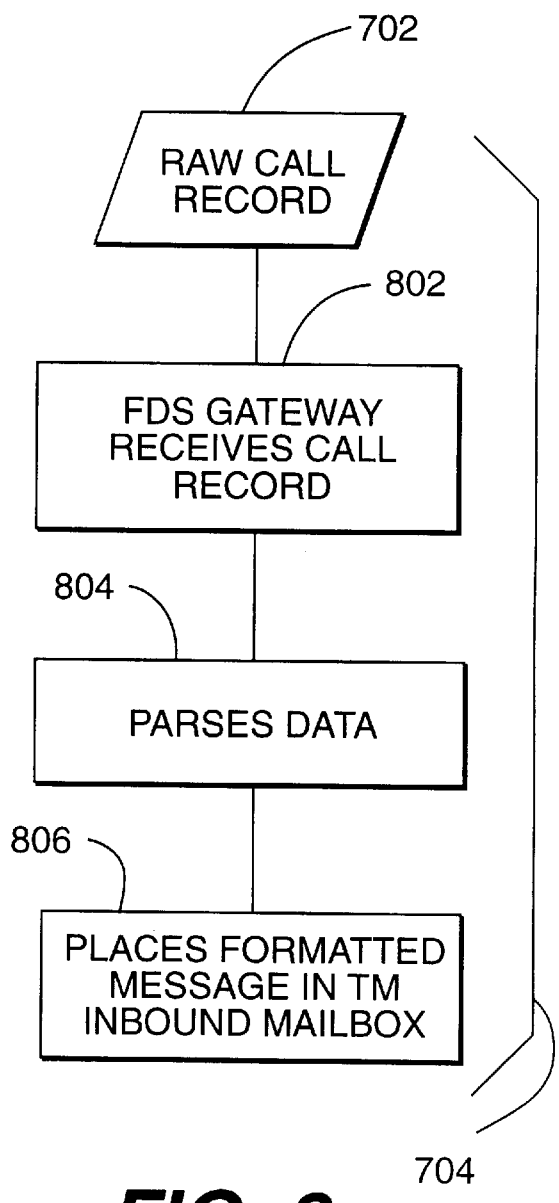
FIG. 8 is a flow diagram of a fraud data server process.

In reference to FIG. 8, which shows the Fraud Data Server Process 704 in detail, the raw call record 702 is input to the process 802 in which the FDS gateway receives the call record. The FDS then parses the data 804 and extracts the data that is pertinent to fraud detection, namely the following fields:

Country Code

Call Duration

Info Digits (identifies the service type of call)

Service Number (for Inbound 800, this is dialed 800#; for Outbound Int'l, this is the ANI if switched access, or the Switch/Trunk i.d. if dedicated access)

Suspect Number (used in TM to match against suspect numbers identified in customer's monitoring plan; for Inbound 800, it is originating ANI; for Outbound Int'l, it is the Int'l Direct Dialed Digits)

Customer ID

Site ID

Time since midnight that completed call terminated (either party hung up)

Switch/Trunk id (for Inbound 800, where it isn't identified as Service Number)

The FDS then formats the record into a message that is readable by the Threshold Manager (TM) and places the formatted message in the TM Inbound Mailbox 806. (If the call record originated from an Outbound International call, the formatted message is placed in the TM Outbound Mailbox).

Figure 9:
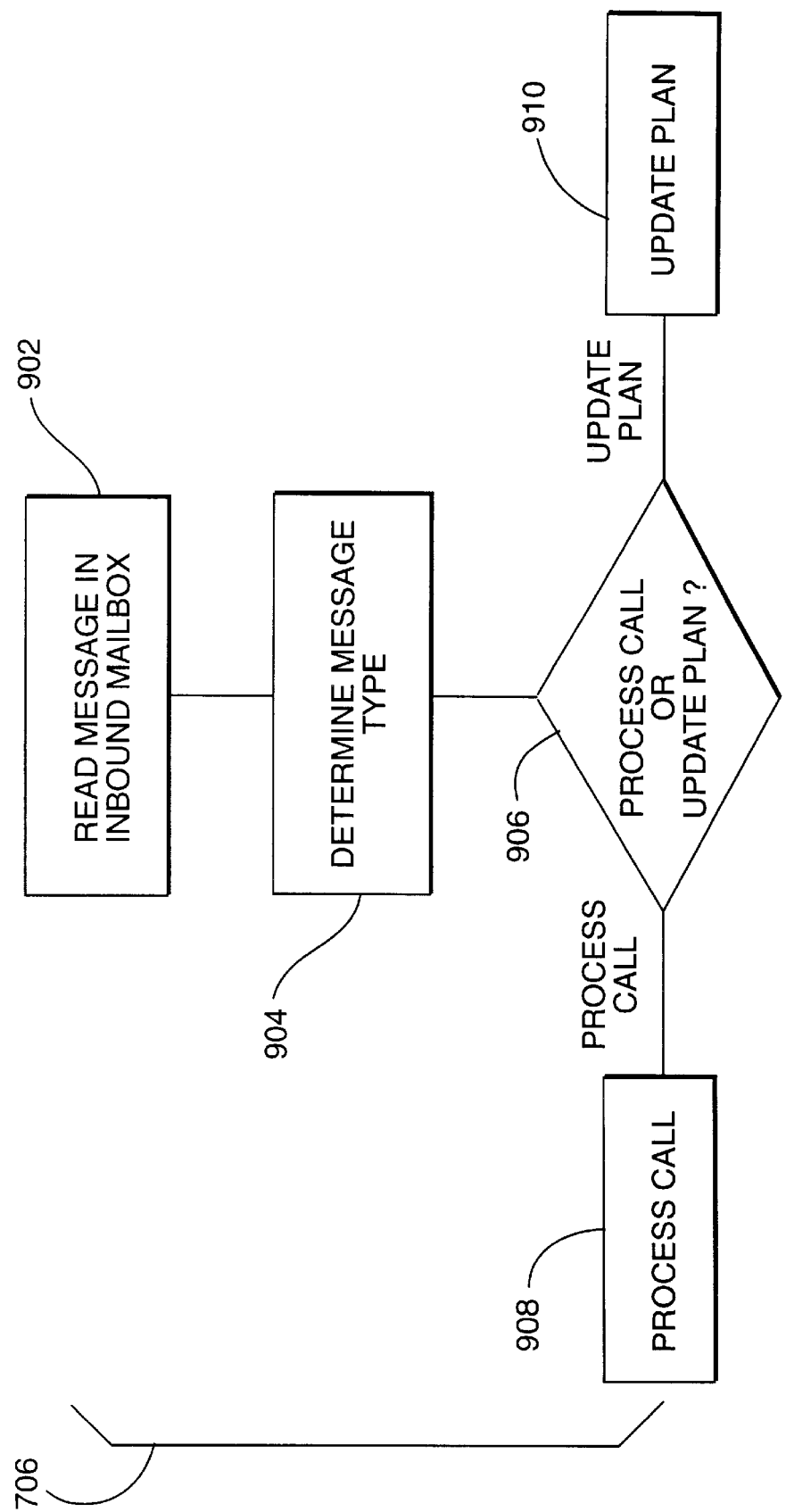
FIG. 9 is a flow diagram of a threshold manager process.

In reference to FIG. 9, which shows the Threshold Manager Process 706 in detail, the TM reads the message in the Inbound Mailbox 902 and determines the message type 904. Alternative to a message representing call record data, a message may represent a request to update a customer's monitoring plan. The TM determines if the message is to process a call or to update a monitoring plan 906.

If the message is to update a plan, the TM executes that update 910.

Figure 9A:
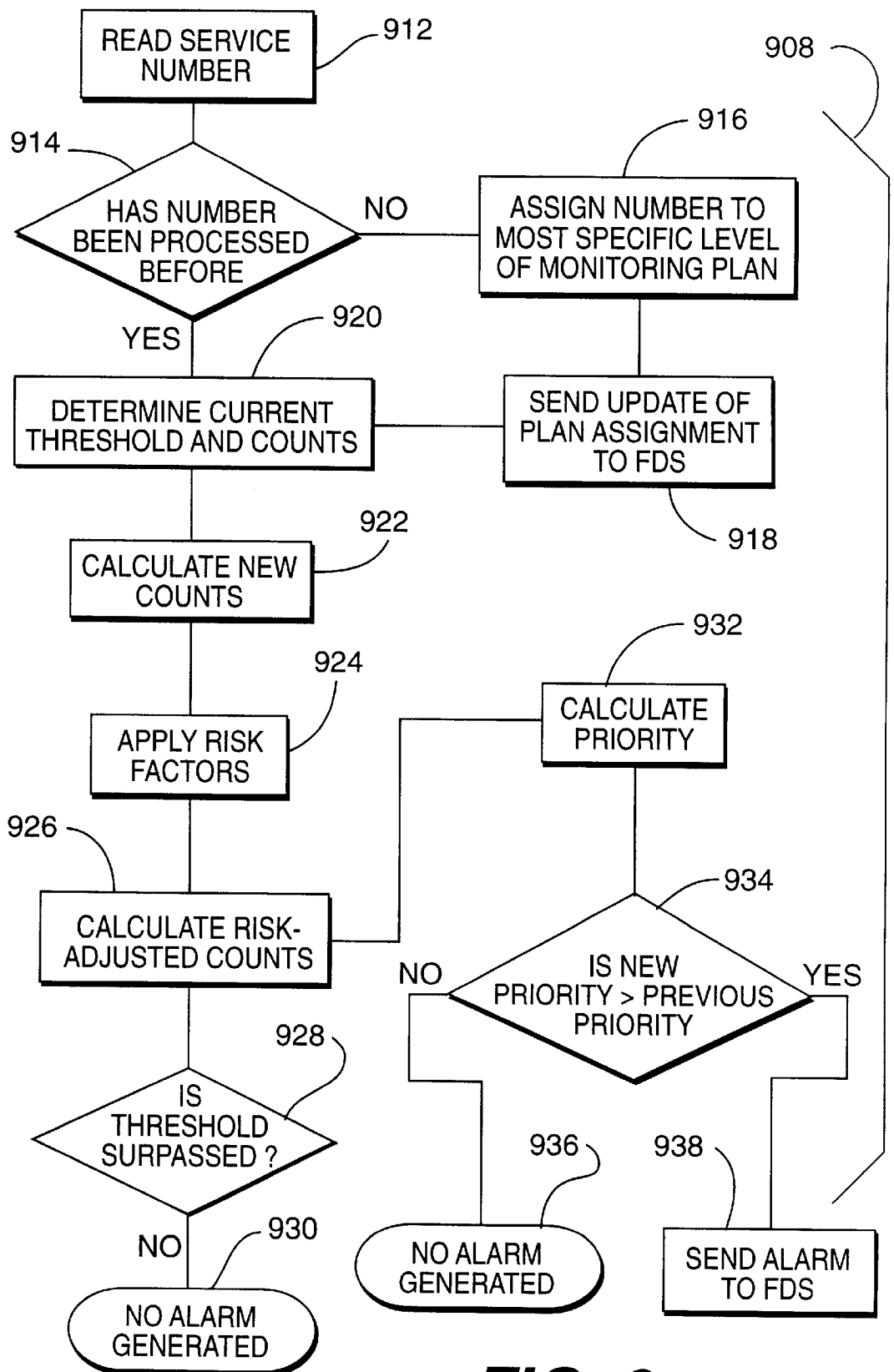
FIG. 9a is a flow diagram of a call handling process.

If the message is to process a call, the TM proceeds to process the call 908, which is shown in detail in FIG. 9a.

In reference to FIG. 9a, which shows how the TM processes a call 908 to determine if an alarm is to be generated, the TM begins by reading the service number 912 (which represents the dialed 800 number for an Inbound 800 call). It then determines if it has processed this service number before 914. If the TM has not processed this number before, it will assign the service number to the lowest level of specification of the customer's monitoring plan 916. This is for the purpose of associating call counts and durations for that number to the appropriate part of the monitoring plan. Examples of Inbound 800 levels of specification in ascending order are:

800 number plus supplemental identification codes 800 number

Corporate Identification Code

Customer ID

Universal plan

For example, if the service number is simply an 800 number, the TM will assign the service number to that part of the monitoring plan that specifies thresholds and counts for that particular 800 number. If no match of service numbers or other codes are found, assignment defaults to a universal monitoring plan.

The TM will then send an update of this plan assignment to the FDS 918. The process then proceeds to the same point it would have been if the TM had determined, from 914, that the number had been processed before.

If the TM determines that the service number has been processed before 914, it queries the part of the customer's monitoring plan that the number is assigned to and determines the current thresholds and counts 920 for that number. Counts relate to the number of short-duration calls, long-duration calls, total call time, and suspect number calls. Thresholds represent the maximum number of counts a number may reach before triggering an alarm.

The TM then calculates new counts 922 by augmenting appropriate counts based on call data associated with the service number. For example, if the service number is an 800 number for which a call lasted 20 minutes (considered long-duration), the long-call count is increased by one.

The TM then applies a risk factor 924 to the call data. A risk factor represents a co-efficient that is entered by the customer to indicate increased risk associated with a particular NPA-NXX, country, calling area, or info digits. If none is entered, the default risk factor is 1. The TM calculates risk-adjusted counts 926 by multiplying the actual counts by the risk factor. For example, if the customer enters a risk factor of 3 for calls received from NPA-NXX 202-887, and a call record is received for a short-duration 800 call from the ANI 202-887-nnnn, the short-duration count of the monitoring plan is increased by 3.

The TM then matches the new risk-adjusted count to the appropriate threshold to determine if the threshold has been surpassed 928. If it hasn't, no alarm is generated 930. If the threshold has been surpassed, then the TM calculates the priority 932 of the potential alarm. The priority is defined as:

risk-adjusted count/threshold

The TM then determines if the calculated priority of the current call message is greater than the priority of the previous call message 934. This is to prevent flooding the FDS with alarms if a string of threshold-breaking call counts come in; only a single alarm is needed in such a case. A history of priorities is kept since the previous midnight; it is refreshed every midnight.

If the current priority is not greater than the previous priority, no alarm is generated 936. If the current priority is greater than the previous priority, the TM sends an alarm to the FDS 938.

Accordingly, as will be appreciated from the previous discussion, the present invention makes available a fraud detection and analysis system which combines a threshold manager interconnected with a workstation to filter information relevant to fraud, for example, culled from a particular site which may be the subject of fraudulent activity in a PBX system transacting inbound 800 number calls, as well as outbound international calls.

It should be understood that the invention is not limited to the exact details of construction shown and described herein for obvious modifications will occur to persons skilled in the art.

We claim:

1. A fraud detection system for telephone PBX calls in a telephone network generating call detail records for the PBX calls, the system comprising:

a fraud data server for buffering the call detail records;

a threshold manager connected to an output of the fraud data server for keeping numerical counts of call data in predetermined fields of the call detail records, multiplying the numerical counts by predetermined risk factors to obtain risk-adjusted counts, detecting risk adjusted counts exceeding preselected threshold values, and generating an alarm in response thereto;

means connecting an output of the threshold manager to an input of the fraud data server for buffering the alarm incident to respective call detail records; and a computer workstation connected to the fraud data server for receiving packets of call detail records relating to alarm data, in a filtered preselected format, the workstation including a monitor for displaying the alarm data on a graphical interface.

2. A fraud detection method for telephone PBX calls in a telephone network generating call detail records for the PBX calls, the method comprising the steps:

buffering the call detail records;

keeping numerical counts of call data in predetermined fields of the call detail records;

multiplying the numerical counts by predetermined risk factors to obtain risk adjusted counts;

detecting risk adjusted counts exceeding preselected threshold values, in predetermined fields of the call detail records;

generating an alarm in response thereto;

buffering the alarm incident to respective call detail records;

transmitting packets of call detail records relating to alarm data, in a filtered preselected format, to a computer workstation including a monitor, for displaying the alarm data on a graphical interface.

3. A fraud detection system for telephone PBX calls in a telephone network generating call detail records for the PBX calls, the system comprising:

a fraud data server having:
 (a) communication gateway means for interfacing the server with the telephone network and filtering out unwanted call detail records;
 (b) parsing means for reformatting call detail records to a preselected format;
 (c) means for storing databases of current and archived call detail records; and
 (d) communication distributing means for providing a communication path between the fraud data server and a computer workstation;

a threshold manager connected to an output of the fraud data server for accepting the call detail records from the parsing means and detecting numerical counts exceeding preselected threshold values, in predetermined fields of the call detail records, and generating an alarm in response thereto;

means connecting an output of the threshold manager to an input of the fraud data server for buffering the alarm incident to respective call detail records;

the computer workstation connected to the communication distributing means of the fraud data server for receiving packets of call detail records relating to alarm data, in a filtered preselected format, the workstation including a monitor for displaying the alarm data on a graphical interface.

4. The system set forth in claim 3 further comprising means connected to the telephone network for storing call detail records generated by the network; and means for connecting the call detail records to the communication gateway means of the fraud data server.

5. A fraud detection method for telephone PBX calls in a telephone network generating call detail records for the PBX calls, the method comprising the steps:

providing a communication gateway for interfacing the server with the telephone network;

filtering out unwanted call detail records;

parsing the filtered call detail records for reformatting them to a preselected format;

storing databases of current and archived call detail records;

providing a communication path for the current and archived call detail records to a computer workstation;

accepting the parsed call detail records for detecting numerical counts exceeding preselected threshold values, in predetermined fields of the call detail records;

generating an alarm in response thereto;

buffering the alarm incident to respective call detail records;

the computer workstation receiving packets of call detail records relating to alarm data, along the communication path, in a filtered preselected format.

6. The method of claim 5 further comprising the step of selectively graphically displaying data processed by the workstation.

7. The method of claim 5 further comprising the steps of storing call detail records generated by the network; and connecting the call detail records to the communication gateway.

8. A fraud detection system for telephone PBX calls in a telephone network generating call detail records for the PBX calls, the system comprising:

a fraud data server for buffering the call detail records;

a threshold manager connected to an output of the fraud data server for detecting numerical counts exceeding preselected threshold values, in predetermined fields of the call detail records, generating an alarm in response thereto and prioritizing the alarm according to how many times the threshold has been exceeded;

means connecting an output of the threshold manager to an input of the fraud data server for buffering the alarm incident to respective call detail records; and a computer workstation connected to the fraud data server for receiving packets of call detail records relating to alarm data, in a filtered preselected format, the workstation including a monitor for displaying the alarm data on a graphical interface.

9. A fraud detection method for telephone PBX calls in a telephone network generating call detail records for the PBX calls, the method comprising the steps:

buffering the call detail records;

detecting numerical counts exceeding preselected threshold values, in predetermined fields of the call detail records;

generating an alarm in response thereto;

prioritizing the alarm according to how many times the threshold has been exceeded;

buffering the alarm incident to respective call detail records;

transmitting packets of call detail records relating to alarm data, in a filtered preselected format, to a computer workstation including a monitor, for displaying the alarm data on a graphical interface.

10. A fraud detection system for telephone PBX calls in a telephone network generating call detail records for the PBX calls, the system comprising:

a fraud data server for buffering the call detail records;

a threshold manager connected to an output of the fraud data server for keeping numerical counts of call data in predetermined fields of the call detail records, multiplying the numerical counts by predetermined risk factors to obtain risk-adjusted counts, detecting risk adjusted counts exceeding preselected threshold values, and generating an alarm in response thereto and prioritizing the alarm according to how many times the threshold has been exceeded;

means connecting an output of the threshold manager to an input of the fraud data server for buffering the alarm incident to respective call detail records; and a computer workstation connected to the fraud data server for receiving packets of call detail records relating to alarm data, in a filtered preselected format, the workstation including a monitor for displaying the alarm data on a graphical interface.

11. A fraud detection method for telephone PBX calls in a telephone network generating call detail records for the PBX calls, the method comprising the steps:

buffering the call detail records;

keeping numerical counts of call data in predetermined fields of the call detail records;

multiplying the numerical counts by predetermined risk factors to obtain risk adjusted counts;

detecting risk adjusted counts exceeding preselected threshold values, in predetermined fields of the call detail records;

generating an alarm in response thereto;

prioritizing the alarm according to how many times the threshold has been exceeded;

buffering the alarm incident to respective call detail records;

transmitting packets of call detail records relating to alarm data, in a filtered preselected format, to a computer workstation including a monitor, for displaying the alarm data on a graphical interface.

* * * * *